UNITED STATES PATENT OFFICE.

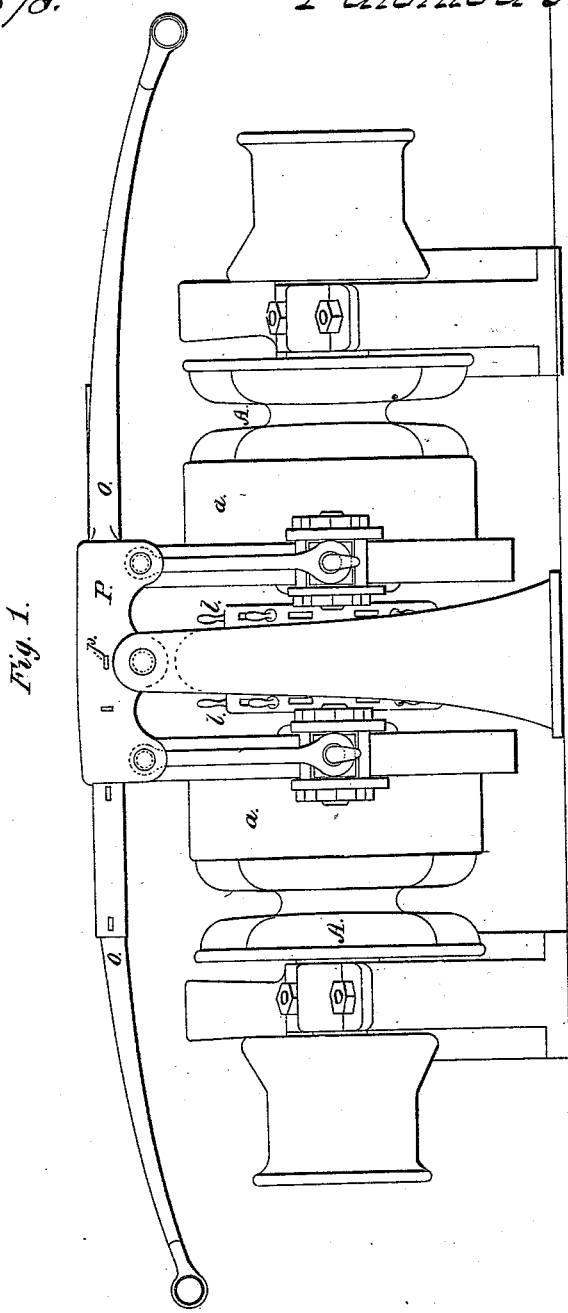

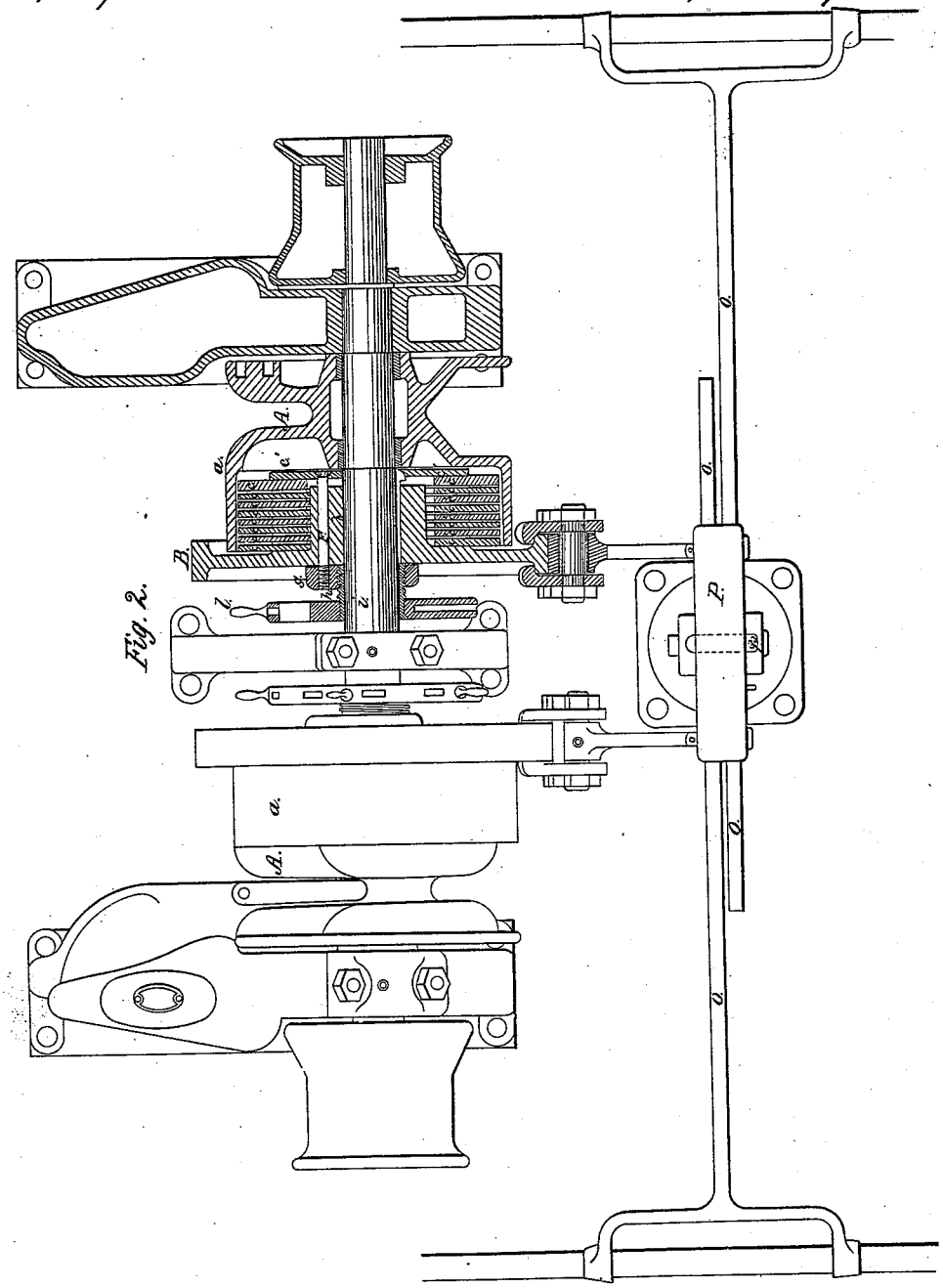

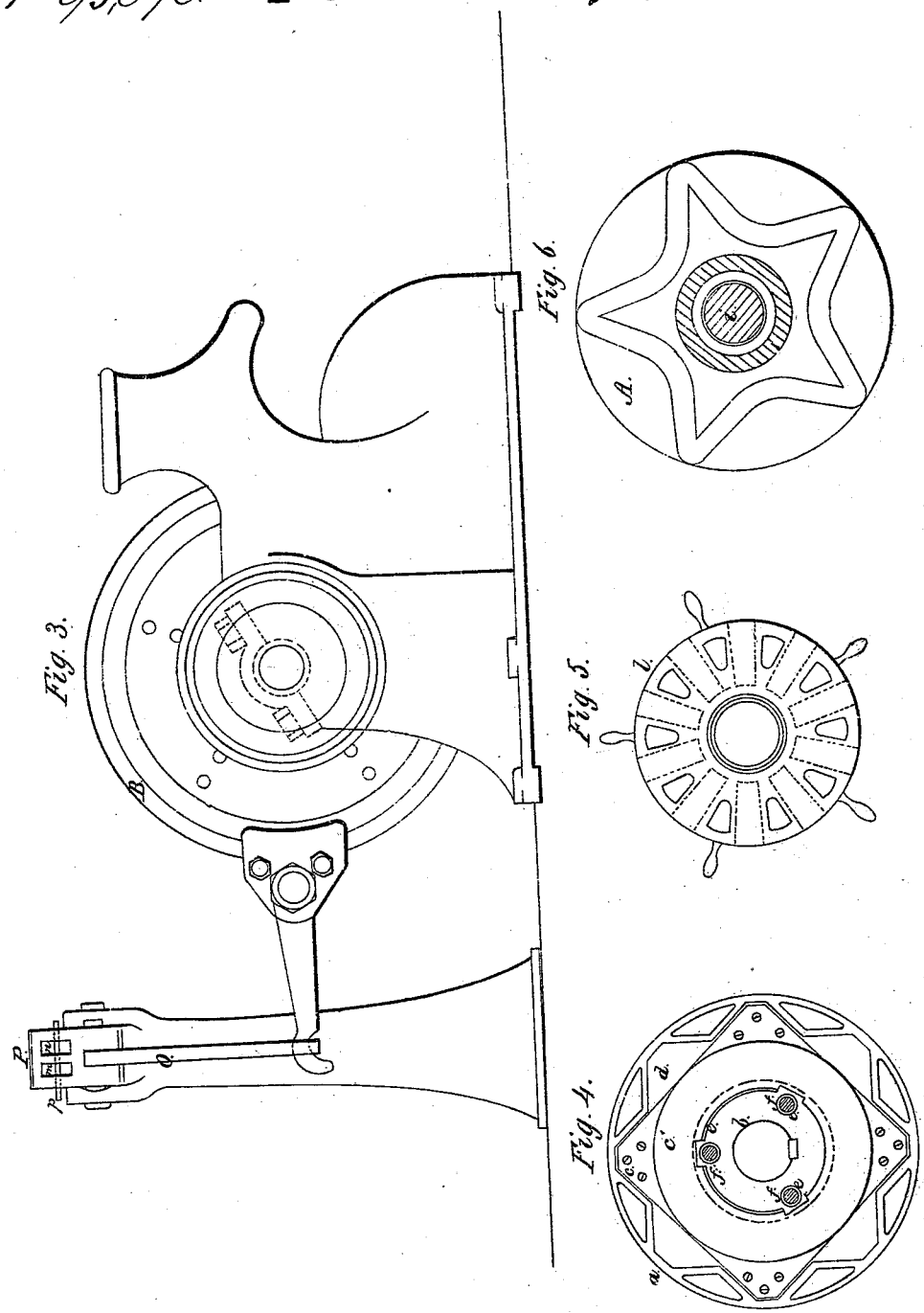

WILLIAM H. HARFIELD, OF LONDON, ENGLAND.

IMPROVEMENT IN WINDLASSES.

Specification forming part of Letters Patent No. 93,878, dated August 17, 1869.

*To all whom it may concern:*

Be it known that I, WILLIAM HORATIO HARFIELD, of the city of London, England, have invented certain Improvements in the Construction of Windlasses; and I do hereby declare that the following is a full and exact description thereof, reference being had to the accompanying drawings, being a part of this specification, in which—

Figure 1 is a front elevation; Fig. 2, a plan view, a portion being shown in section; Fig. 3, an end elevation. Fig. 4 is a section through the drum $a$, showing the disks $c\ c'$ in elevation. Fig. 5 is a detached view of the hand-wheels; Fig. 6, a section through the chain-wheel.

Like letters indicate corresponding parts.

The object of my invention is to dispense with the rigid connector hitherto used in connecting the freely-revolving chain-wheel with the main barrel of the windlass, substituting a frictional connector, which also acts as a brake to check the cable in veering, and enables one chain-wheel to be used independently of the other.

The manner in which I apply the friction-connector is shown on the drawings, and is as follows: The chain-wheel A is constructed with a drum, $a$, which overlaps the boss $b$ of purchase-wheel B, Fig. 2. In the annular space between boss of purchase-wheel $b$, and overhanging drum $a$ of chain-wheel, is fitted a double series of disks, $c$ and $c'$, (shown in section in Fig. 2,) one series, $c$, being fitted to slide on lateral projections or feathers $d$, Fig. 4, in interior of drum $a$, therefore having the same circular motion, the other series, $c'$, in like manner sliding on lateral feathers $e$ on exterior of boss $b$, and revolving with purchase-wheel B. The disks $c'$ on the purchase-wheel alternate with those on drum $a$; but as they are free to move in a lateral direction the chain-wheel A, with its series of disks $c'$, can be revolved freely and quite independent of purchase-wheel B with its series of disks $c'$.

When it is required either to check the veering out of the chain or to connect the chain-wheel to the windlass for heaving in, the whole series of disks are compressed together, by which the friction due to the power applied is multiplied by the number of surfaces in the double series of disks. This compression of the disks is accomplished in the following manner: The outside disk, $c'$, from the purchase-wheel has three bolts, $f$, which pass through the purchase-wheel, and are secured to a nut, $g$, on the other side, which is acted upon by a screw, $h$, mounted loosely on the spindle $i$ and revolved by a hand-wheel, $l$. This screw $h$ bears against the purchase-wheel, and when it is revolved in one direction it draws the nut $g$ from the purchase-wheel and compresses the whole of the disks together, the reverse direction releasing them.

I prefer to make the disks $c'$ on the purchase-wheel of galvanized iron and the disks $c$ in drum of teak, but other materials may be used.

A further part of my invention relates to an easy method of varying the power or speed of windlasses. I do this by casting two holes, $m$ and $n$, for levers O, side by side, through the whole length of the cross-head P. The levers, being disconnected, can very readily be moved in or out, thus varying the power by increasing or diminishing their effective length. A collar, $p$, passes through the cross-head, securing levers when put in the position required.

I do not claim the arrangement of a double series of disks for the purpose of producing friction; but

What I claim as my invention, and desire to secure by Letters Patent, is—

The combination and arrangement of the compressor, purchase-wheel B, nut $g$, and screw $h$, to form a windlass and brake, and by means of which the chain-wheel can be employed independently of the other, substantially as described.

In witness whereof I have hereunto signed my name in the presence of two subscribing witnesses.

WILLIAM HORATIO HARFIELD.

Witnesses:
 JNO. BUDGES,
 SAML. BROOKES.